June 16, 1964 W. B. GAUNT, JR 3,137,843

MAGNETIC WIRE MEMORY CIRCUITS

Filed Dec. 29, 1960

INVENTOR
W. B. GAUNT, JR.
BY
William H. Kamstra
ATTORNEY 3,137,843

MAGNETIC WIRE MEMORY CIRCUITS

Wilmer B. Gaunt, Jr., Florham Park, N.J., assignor to Bell Telephone Laboratories, Incorporated, New York, N.Y., a corporation of New York Filed Dec. 29, 1960, Ser. No. 79,459
15 Claims. (Cl. 340—174)

Figure 1:
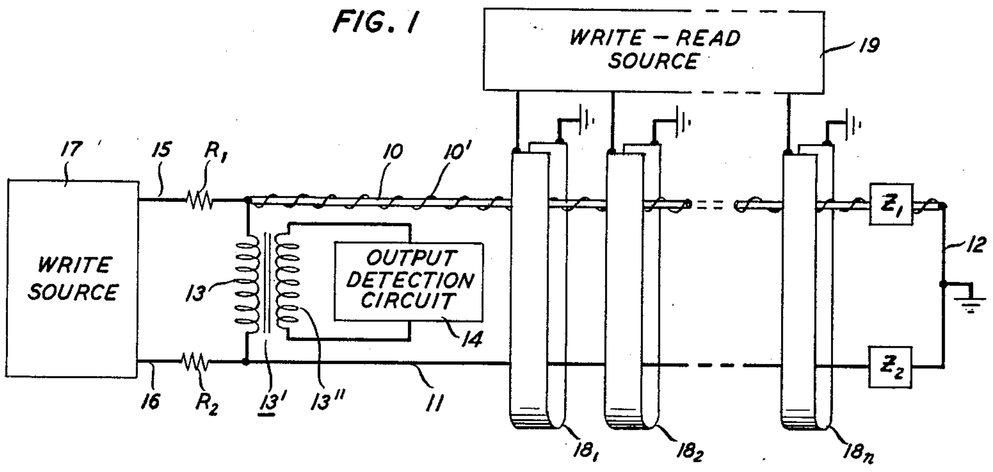

This invention relates to information storage arrangements and more particularly to such arrangements in which information is stored in the form of remanent flux states in magnetic memory wire elements.

Magnetic information storage arrangements employing magnetic memory elements as information storage addresses are well known in the information handling and processing art. The substantially rectangular hysteresis characteristics of the magnetic materials of which such memory elements are fabricated enable the elements to store binary values by being magnetized in either of two remanent flux states. The well-known torodial magnetic core, for example, has one binary value associated with one of the remanent states and the other binary value associated with the other of the remanent states.

An advantageous departure from previous arrangements is represented by the magnetic wire element described by A. H. Bobeck in the copending application Serial No. 675,522, filed August 1, 1957, now Patent No. 3,083,353, issued March 26, 1963. Information is stored in the magnetic wire element in the form of polarized magnetizations of a helical flux path axially coincident with the memory wire. The information stored in a particular bit address defined along the memory wire is determined by the magnetic polarization of that portion of the helical flux path associated with the particular bit address. A particular polarization state is determined by the magnitude and direction of the selection fields. Axial selection fields may be generated by current passing through a solenoid concentric with the memory wire while circular fields may be generated by passing current down the memory wire itself. By adjusting each field so that it alone is insufficient to affect the direction of magnetization while their vector sum exceeds the threshold required for reversing the direction of magnetization, coincident current selection is advantageously achieved. Of course, a large enough axial or circular field can be used alone for flux reversal and the reading out of stored information may advantageously be accomplished by utilizing a single large axial field. The memory wire is thus used as both the storage medium and as one of the access wires and may additionally serve as the sense wire since it "senses" a change in the direction of the magnetic flux and the voltage thereby induced is propagated to read detection circuits.

During the write phase of operation of a magnetic wire memory array, a relatively high current is applied to each memory wire in which a particular information bit, say a binary "1," is to be stored. This current is transmitted, in some arrangements, along the memory wire to the read detection circuits at which point, because of its amplitude, an overloading of detecting amplifiers included in the detection circuits may occur. Since the time interval between the write and read phase of operation is ordinarily very short, the interval may not be sufficient to allow full recovery of a detection amplifier with the result that insufficient gain is available for the detection of output signals during an immediately following read phase of operation. Additionally, any transient currents following the applied write current pulse may have insufficient time for dissipation between the write and read phases and, as a result, may interfere with subsequently induced read-out signals. The write signals may advantageously be isolated from the detection circuitry by means of a return wire associated with each memory wire as described by D. C. Weller in the copending application Serial No. 791,230, filed February 4, 1959, now Patent 3,000,004, issued September 12, 1961. The memory wire and return wire are connected at one end to the primary of a transformer having a center tap connected to ground. An output detection circuit is connected to the secondary of the transformer. The other end of the memory wire-return wire pair may be coupled through equal resistors to a source of write signals. The resistors are chosen to have a total resistance equal to the characteristic impedance of the memory wire-return conductor pair to eliminate, during the read phase of operation, possible echo effects produced by impedance mismatches at the write or input end of the element. This eliminates the induced signal reflected from the input end which otherwise would be detected by the read circuitry as a spurious output subsequent to the detection of the desired information output signal. Alternatively the memory wire and return wire may be connected at their other ends to the primary of a second transformer having a 1:1 turns ratio. The primary has a center tap connected to a source of write signals while a resistor having a resistance equal to the characteristic impedance of the memory wire-return conductor pair is connected to the transformer secondary.

Any currents applied to the memory element from the input source will advantageously pass along a memory wire and its return conductor in the same direction and will pass to ground through the center tapped transformer at the other end. If the impedances of the memory wire and return wire are also matched, the currents in the two paths will be equal and the output detection circuits are effectively isolated from the write input currents during the write phase of operation. Noise signals introduced in both a memory wire and its return conductor during the read phase of operation will likewise be passed to ground without being transmitted to the output detection circuits. Desired read-out signals representative of stored information being sensed will, on the other hand, be transmitted serially along the memory wires to the output detection circuits. Since the signals representative of stored information are induced in a memory wire alone, the resulting imbalance of the parallelly connected memory wire and its return conductor will cause the signal to be transmitted along the serially connected memory wire-return conductor elements to the output detection circuits.

The isolation of the detection circuits from the input currents during the write phase of operation requires that the input current flowing through the memory wire be of the same magnitude as the input current flowing through the return conductor. The balancing of these currents requires a precise balancing of the resistors added at the input end of the element and of the resistances of the magnetic wire element and of the return wire themselves. Considerable difficulty is encountered in balancing these resistances, whether initially or after indefinite aging, at all temperatures, and accordingly there generally is some input signal noise present in the output during the write phase.

Since a measure of the complexity of the read detecting circuitry required is the ratio of the signal output during the read phase of operation to the write signal noise during the write phase, it is accordingly an object of this invention to increase the magnitude of this ratio.

It is another object of this invention to reduce the noise signals appearing in the output circuitry of memory arrays employing memory wire-return conductor pairs due to imperfect balancing of the impedances of the two paths presented by the memory wire and return conductor.

It is still another object of this invention to increase the power of the output signal available to the detection circuitry of memory arrays employing memory wire-return conductor pairs.

It is a further object of this invention to provide a new and improved magnetic information storage circuit.

The foregoing and other objects are achieved in one specific illustrative embodiment of this invention comprising a magnetic memory wire and return conductor short circuited at one end. The primary of an output transformer, which need not be center tapped, is connected between the other ends of the memory wire and return conductor, and output detection circuitry is connected to the secondary of the transformer. Input signals are also applied to the ends of the memory wire and return conductor across the transformer primary and may advantageously be applied through equal resistors, thereby reducing the time constant of the circuit and permitting the read phase of operation to follow closely upon the termination of the applied input signals. In an alternative illustrative embodiment of this invention the primary of the output transformer is center tapped and the input signals applied to the element through a resistor, also used to reduce the time constant of the circuit, connected to the center tap of the primary.

The above-described circuitry will, under normal operating conditions, provide an output signal to the detection circuitry which is of substantially greater power than that provided by prior magnetic memory wire and return conductor arrangements. It further diminishes the magnitude of the write signal noise appearing in the output circuitry and increases the ratio of the output signal appearing during the read cycle to the input noise signal appearing during the write cycle over that realized by previous memory wire-return wire circuitry. Any undesirable echo effects or impedance peaks along the length of the memory wire-return conductor pair due to the impedance mismatch at the short circuited end may be satisfactorily avoided by keeping the memory wire and return wire below a particular maximum length. Thus, if the total length of the memory wire-return wire pair is substantially less than a quarter wavelength, the wavelength being determined on the basis of that component of the output signal induced in the memory wire having the highest frequency and a significant amplitude, undesirable effects caused by such an impedance mismatch are avoided.

Accordingly, it is a feature of this invention that a magnetic memory wire and return conductor are short circuited at one end with energizing signals applied to the other end.

According to another feature of this invention a magnetic memory wire and return conductor are connected at the input end by a transformer winding inductively coupled to output circuitry and are short circuited at their other end.

According to a feature of one illustrative embodiment of this invention, input signals are applied through two equal resistances to ends of a magnetic memory wire and return conductor connected by a transformer winding inductively coupled to output circuitry, the other ends of the memory wire and return conductor being short circuited.

According to a feature of another illustrative embodiment of this invention, input signals are applied to a center tapped transformer winding connecting a magnetic memory wire and return conductor which are short circuited at their other end.

Figure 2:
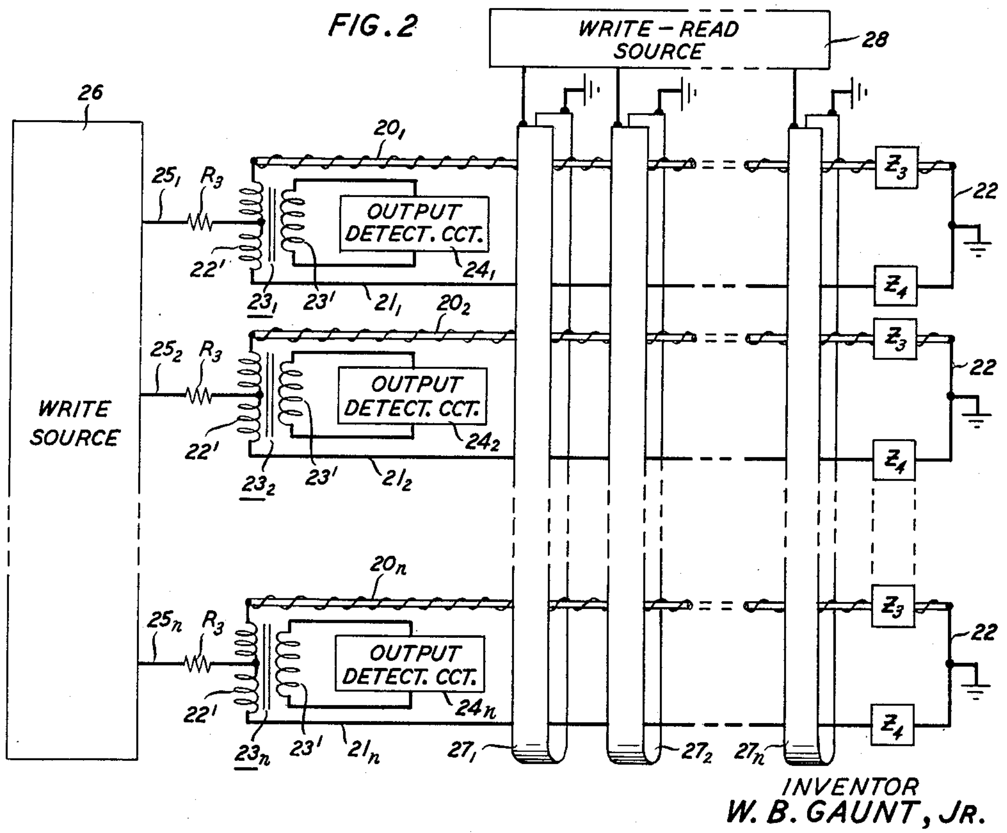

The foregoing and other objects and features of this invention will be more clearly understood from a consideration of the detailed description of illustrative embodiments thereof which follows when taken in conjunction with the following drawing in which:

FIG. 1 depicts an illustrative embodiment of a magnetic memory element according to the principles of this invention comprising a single word row; and FIG. 2 depicts an illustrative single plane word organized memory array according to the principles of this invention.

A specific illustrative embodiment of a memory circuit according to the principles of this invention is shown in FIG. 1. A magnetic memory wire 10 and return conductor 11 are short circuited at one end by lead 12 to a source of ground potential. The memory wire 10 may comprise any one of the elements described in detail in the copending application of A. H. Bobeck referred to hereinbefore. The wire 10 thus may advantageously include a square loop helical magnetic element 10' axially coincident with an electrical conductor. At their other ends, wire 10 and return conductor 11 are both connected to the ends of a primary winding 13 of a transformer 13', the secondary winding 13'' of which is connected to an output detection circuit 14. The ends of the memory wire 10 and return conductor 11 connected to the transformer primary winding 13 are also respectively connected to leads 15 and 16, which leads contain equal resistance elements $R_1$ and $R_2$, respectively, and are connected to a write current source 17. Information addresses are defined along the memory wire 10 by energizing solenoids $\mathbf{18}_1$, $\mathbf{18}_2$, . . . and $\mathbf{18}_n$ which encircle the memory wires 10 and return conductor 11 and are inductively coupled to the memory wire 10. Each of the solenoids 18 is connected between a write-read current source 19 and a source of ground potential. The distributed impedance along the memory wire 10 is represented for illustrative purposes as the lumped impedances $Z_1$. Likewise the total impedance of the return conductor 11 is represented by the lumped impedance $Z_2$. The current sources 17 and 19 are shown in block diagram form and may comprise well-known circuits capable of providing read and write signals of the nature described hereinafter. The detection circuit 14 is also shown in block diagram form and may comprise any circuit capable of detecting output signals induced in the secondary winding 13''. Bearing in mind the foregoing organization, a detailed description of the operation of this circuit will now be set forth.

Assuming the memory wire 10 to be in a cleared state following a previous read phase of operation, information may be written into the circuit by the simultaneous application of positive half-select write signals from the write source 17 to the leads 15 and 16 and from the write-read source 19 to selected ones of the energizing solenoids 18. If the binary information values 1, 0, . . . 1 are to be stored in the circuit, for example, simultaneous positive write signals are applied from source 17 to the leads 15 and 16 and from the source 19 to solenoids $\mathbf{18}_1$ and $\mathbf{18}_n$. The magnetic fields produced in the vicinity of the bit addresses defined on memory wire 10 by solenoids $\mathbf{18}_1$ and $\mathbf{18}_n$ are sufficient to reverse the remanent magnetization in these bit addresses. The resulting remanent condition may be considered representative of a binary "1." The magnetic field produced in the vicinity of the bit address defined on memory wire 10 by the solenoid $\mathbf{18}_2$, however, is insufficient to reverse the remanent magnetization in this bit address. The remanent magnetization of this bit address thus remains in the cleared state which state may be considered representative of a stored binary "0."

The write signals applied to the leads 15 and 16 from source 17 travel through the leads 15 and 16, respectively, and the memory wire 10 and the return conductor 11, respectively, to a source of ground potential at the other end of the circuit. If resistances $R_1$ and $R_2$ are equal and impedances $Z_1$ and $Z_2$ are equal, none of the write signal appears in the primary 13 of transformer 13' and no write noise signal appears at detection circuit 14 during the write phase of operation. However, since it is difficult to balance these resistances and impedances perfectly, either initially or after aging, there is always some write signal noise present in the output circuitry during the input phase of operation. However, under normal operating conditions, such a noise signal appearing in the output circuitry is substantially less for the above-described circuitry than for previous memory wire circuitry capable of providing output signals of the same magnitude as does the above-described circuitry. Since the ratio of signal output to the write noise signal appearing during the write phase is one measure of the complexity of the output detection circuitry, the circuitry described above represents a substantial improvement over prior art arrangements.

Since the memory wire 10 and return conductor 11 comprise a circuit containing both resistance and inductance, the decay of the current in the circuit upon the termination of the input signals may be accelerated by the insertion of additional resistance elements in the circuit. The balanced resistors $R_1$ and $R_2$ diminish the time constant of the circuit thereby permitting the read phase of operation to follow more closely upon the termination of the write phase of operation.

Following the above-described illustrative write phase of operation the binary information 1, 0, . . . 1 is stored in the circuit of FIG. 1. This information may advantageously be read out during a subsequent read phase of operation. At this time negative read-out signals are applied from source 19 to the energizing solenoids 18. These signals are of a magnitude sufficient to produce a magnetic field capable of reversing the remanent magnetization of an information address from the "1" state to the cleared or "0" state. Thus a read-out signal applied from source 19 to the solenoid $\mathbf{18}_1$ causes a reversal of the remanent magnetization of the information address associated with this solenoid, which reversal induces a signal in the memory wire 10. This signal passes through the primary 13 of transformer 13' and induces an output signal in the secondary 13'' of the transformer which is detected by the output circuitry 14. The detection of this output signal is indicative of the storage of a binary "1" in the information address associated with solenoid $\mathbf{18}_1$. A subsequent read-out signal applied to solenoid $\mathbf{18}_2$ does not produce an output signal in the secondary 13'' of transformer 13' since the remanent magnetization of the information address associated with solenoid $\mathbf{18}_2$ is already in the cleared or "0" condition. This output signal condition is indicative of the storage of a binary "0" in this information address. A subsequent read-out signal applied to solenoid $\mathbf{18}_n$ produces an output signal detected by output circuitry 14 in a manner similar to that described in connection with the read-out signal applied to solenoid $\mathbf{18}_1$, and the detection of this output signal is indicative of the binary "1" stored in the information address associated with solenoid $\mathbf{18}_n$.

The output signals indicative of binary "1's" which are detected by the output circuitry 14 are of considerably greater power than are the corresponding output signals produced in analogous circuitry hitherto known. Since the memory wire 10 and return wire 11 are not terminated in their characteristic impedance but rather are terminated in a short circuit in the above-described embodiment, there is no power lost to such a terminating impedance in the circuit described above and there is consequently greater output signal power available in this circuit. Any undesirable echo effects or impedance peaks along the length of the memory wire-return conductor pair due to this impedance mismatch is satisfactorily avoided by keeping the memory wire 10 and return conductor 11 below a particular maximum length. The signals induced in the memory wire 10 by the read-out currents applied to the solenoids 18 may be considered to be composed of a combination of signal components of varying frequency. The total length of the memory wire-return wire pair is made to be substantially less than a quarter wavelength, with the wavelength determination based on the highest frequency component of the signal induced in memory wire 10 having a significant amplitude. Since the line impedance of a short circuited transmission line goes through a sharp peak at a distance of a quarter wavelength from the short circuited end, such impedance peaks can be avoided by keeping the total length of the memory wire-return conductor pair below a quarter wavelength. The signals induced at any information address along the memory wire 10 during the read phase of operation then see a relatively small impedance and these signals are faithfully passed to the output detection circuitry 14.

Another specific illustrative embodiment of a memory circuit according to the principles of this invention is depicted in FIG. 2. Magnetic memory wires $\mathbf{20}_1$, $\mathbf{20}_2$, . . . $\mathbf{20}_n$ and return conductors $\mathbf{21}_1$, $\mathbf{21}_2$, . . . $\mathbf{21}_n$ are respectively short circuited at one end by leads 22 to a source of ground potential. At their other ends the memory wire-return wire pairs are connected, respectively, to the primary windings 22' of transformers $\mathbf{23}_1$, $\mathbf{23}_2$, . . . $\mathbf{23}_n$, the secondary windings 23' of which are connected, respectively, to output detection circuits $\mathbf{24}_1$, $\mathbf{24}_2$, . . . $\mathbf{24}_n$. The primary windings 22' of the transformers 23 are center tapped and leads $\mathbf{25}_1$, $\mathbf{25}_2$, . . . $\mathbf{25}_n$ are connected, respectively, between the center tapped primary windings 22' of the transformers $\mathbf{23}_1$, $\mathbf{23}_2$, . . . $\mathbf{23}_n$ and a write current source 26. Equal resistance elements $R_3$ are included in the leads 25. Information addresses are defined along each memory wire 20 by energizing solenoids $\mathbf{27}_1$, $\mathbf{27}_2$, . . . and $\mathbf{27}_n$ which encircle the memory wires 20 and return conductors 21 and are inductively coupled to each of the memory wires 20. Each of the solenoids 27 is connected between a write-read current source 28 and a source of ground potential. The distributed impedance along each memory wire 20 is represented for illustrative purposes as the lumped impedance $Z_3$. Similarly, the total impedance of each return conductor 21 is represented by the lumped impedance $Z_4$. The current sources 26 and 28 are shown in block diagram form and may comprise well-known circuits capable of providing read and write signals of the nature described hereinafter. The detection circuits 24 are also shown in block diagram form only and may comprise any circuits capable of detecting output signals induced in the secondary windings 23' of the transformers 23.

The operation of the word organized single plane memory array shown in FIG. 2 is similar to that previously described in connection with the circuit of FIG. 1. Thus an information word is written into the array by the simultaneous application of positive half-select write signals from the write source 26 to selected ones of the leads $\mathbf{25}_1$, $\mathbf{25}_2$, . . . $\mathbf{25}_n$ and from the write-read source 28 to selected ones of the solenoids 27. Information is subsequently read out of the array by the application of negative read signals from write-read source 28 to the solenoids 27. The completion of the read phase of operation leaves the information addresses associated with the words previously interrogated in a cleared remanent magnetic condition. Thus, for example, if the array is assumed to be in a cleared magnetic condition and the illustrative binary word 0, 1, . . . 1 is to be stored in information addresses defined on the memory wires 20 by the exemplary solenoid $\mathbf{27}_2$, half-select currents are simultaneously applied to lead $\mathbf{25}_2$ . . . $\mathbf{25}_n$ from write source 26 and to solenoid $\mathbf{27}_2$ from write-read source 28. Those information addresses experiencing a magnetic field resulting from the combined effect of signals passing through the memory wires 20 and the signal passing through the solenoid $\mathbf{27}_2$, undergo a reversal in their remanent magnetization from their cleared or "0" state to a state representative of the storage of a binary "1." The resulting magnetic conditions of the information addresses associated with solenoid $\mathbf{27}_2$ are representative of the binary word 0, 1, . . . 1.

The write signals applied to the leads 25 from source 26 travel through the memory wires 20 and return wires 21 to the source of ground potential at the other end of each memory wire-return conductor pair. If the impedances $Z_3$ and $Z_4$ are equal, the currents in the two paths of each pair will be equal and none of the write signal will appear at the output detection circuitry 24 during the write phase of operation. Since such an exact balance is virtually impossible, as described previously, some write signal noise does appear at the detection circuit 24 during the write phase. However, the magnitude of this write signal noise, under normal operating conditions, is even smaller for the embodiment of this invention shown in FIG. 2 than for the embodiment of FIG. 1. This results because of the replacement of the resistances $R_1$ and $R_2$ of FIG. 1 by the single resistance $R_3$ of FIG. 2. By connecting a resistance $R_3$ to the center tap on the primary of each transformer 23, the problem of balancing resistances $R_1$ and $R_2$ is eliminated. Each resistance $R_3$, like the resistances $R_1$ and $R_2$ of FIG. 1, is used to reduce the time constant of each of the circuits comprising a memory wire 20 and return conductor 21 to permit the read phase of operation to follow closely upon the termination of the write phase.

The binary word 0, 1, . . . 1 is subsequently read out of the array by the application of a negative read-out signal from source 28 to solenoid 27$_2$. This signal produces a magnetic field sufficient to reverse the remanent magnetization of those information addresses associated with the solenoid 27$_2$ from a binary "1" state back to a cleared or binary "0" state. These magnetization reversals cause output signals to appear at detection circuits 24$_2$ . . . 24$_n$ which output signal conditions manifest the storage of the binary word 0, 1, . . . 1. The output signals appearing at the detection circuits 24 are also of considerably greater power than the output signals produced in the circuitry of analogous prior art arrangements. The length of each memory wire-return conductor pair of the circuit of FIG. 2 is also advantageously made substantially less than a quarter wavelength.

The embodiment depicted in FIG. 2 is a single plane word organized memory array. However, multiplane arrays may also be constructed according to the principles of this invention as is well known in connection with memory arrays employing specifically different memory elements.

The specific embodiments of this invention described herein are to be understood as merely illustrative. Numerous other arrangements according to the principles of this invention may be devised by one skilled in the art without departing from the spirit and scope of this invention.

What is claimed is:

1. An electrical circuit comprising a magnetic memory wire having a flux path capable of assuming stable magnetic remanent states, an electrical return conductor, one end of said memory wire and one end of said return conductor being terminated in a short circuit, the other ends of said memory wire and said return conductor being connected by a first transformer winding, a second transformer winding coupled to said first transformer winding, energizing means inductively coupled to said memory wire defining an information address thereon, means for applying a first current pulse to said energizing means, means for applying a second current pulse to said other ends of both said memory wire and return conductor coincidently with said first current pulse to induce a stable magnetic remanent state at said information address, means for subsequently applying a read current pulse to said energizing means to reverse said stable state at said information address, and output means connected to said second transformer winding for detecting flux reversals in said memory wire.

2. An electrical circuit comprising a magnetic memory wire having a flux path capable of assuming stable magnetic remanent states, an electrical return conductor, one end of said memory wire and one end of said return conductor being terminated in a short circuit, energizing means inductively coupled to said memory wire defining an information address thereon, write means for inducing a stable magnetic remanent state at said information address including means for applying a first write current pulse to said energizing means and a second write current pulse to the other end of both said memory wire and said return conductor, means for subsequently applying a read current pulse to said energizing means to reverse said stable remanent state at said information address, and output means for detecting output signals induced by flux reversals in said memory wire.

3. An electrical circuit according to claim 2 in which said means for inducing a stable magnetic remanent state further comprises a first and a second resistance element connected respectively to the other ends of said memory wire and said return conductor, and means for applying said second write current pulses to said resistance elements coincidently with said first write current pulse.

4. An electrical circuit according to claim 3 in which said output means comprises a first transformer winding connected between said other ends of said memory wire and return conductor, a second transformer winding coupled to said first transformer winding, and detection means connected to said second transformer winding.

5. An electrical circuit according to claim 2 in which said means for inducing a stable magnetic remanent state further comprises a resistance element connected to the other ends of said memory wire and said return conductor, and means for applying said second write current pulse to said resistance element coincidently with said first write current pulse.

6. An electrical circuit according to claim 2 in which said write means further comprises a center tapped first transformer winding connected between said other ends of said memory wire and return conductor, a resistance element connected to the center tap of said first transformer winding, and means for applying a second write current pulse to said resistance element coincidently with said first write current pulse.

7. An electrical circuit according to claim 6 in which the length of said memory wire and said return conductor are substantially less than a quarter wavelength as determined by the component of said output signals having the highest frequency.

8. An electrical circuit according to claim 7 in which the total impedance of said return conductor is substantialy equal to the total impedance of said memory wire.

9. An electrical circuit according to claim 8 in which said output means comprises a second transformer winding coupled to said first transformer winding, and detection means connected to said second transformer winding.

10. An electrical circuit comprising a magnetic memory wire having a helical flux path capable of assuming stable remanent states, an electrical return conductor, one end of said memory wire and one end of said return conductor terminating in sources of equal potential, a plurality of energizing means inductively coupled to said memory wire and defining a plurality of information addresses thereon, means for inducing stable magnetic remanent states at said information addresses including means for selectively applying write current pulses to said energizing means and to the other end of both said memory wire and said return conductor, means for selectively applying read current pulses to said energizing means to reverse said stable remanent states at said information addresses, and output means for detecting flux reversals in said memory wire.

11. An electrical circuit comprising a plurality of magnetic memory wire-electrical return conductor pairs, each of said memory wires having a helical flux path capable of assuming stable remanent states, each of said memory wire-return conductor pairs being terminated at one end by a short circuit, a plurality of energizing means inductively coupled to said memory wires and defining an array of information addresses thereon, means for inducing stable magnetic remanent states at said information addresses including means for selectively applying first write current pulses to said energizing means and second write current pulses to both said memory wire and return conductor at the other end of said pairs, means for selectively applying read current pulses to said energizing means to reverse said stable remanent states at said information addresses, and output means for detecting signals induced by flux reversals in said memory wires.

12. An electrical circuit according to claim 11 in which said means for inducing stable magnetic remanent states further comprises a plurality of center tapped transformer windings connected respectively between the other ends of said plurality of memory wire-return conductor pairs, a plurality of resistance elements connected respectively to the center taps of said plurality of transformer windings, and means for selectively applying said second write current pulses to said resistance elements coincidently with said first write current pulses.

13. An electrical circuit according to claim 12 in which the total impedance of each of the return conductors is substantially equal to the total impedance of its associated memory wire.

14. An electrical circuit according to claim 13 in which the length of each of said memory wire-return conductor pairs is substantially less than a quarter wavelength as determined by the component of said output signals having the highest frequency.

15. An electrical circuit comprising a magnetic wire memory element having a helical flux element axially coincident therewith, said element having substantially rectangular hysteresis characteristics, an electrical return conductor connected at one end to one end of said wire memory element and ground potential, a transformer means having a primary winding connected to the other ends of said return conductor and said wire memory element, and a secondary winding connected to output detection circuit means, energizing solenoid means coupled to said wire memory element and said return conductor and defining an information address on said wire memory element, input circuit means comprising a first and a second resistor element connected to the ends of said primary winding, respectively, and means for coincidently applying energizing current pulses to said first and second resistor elements and to said solenoid means for inducing a particular magnetic state in said wire memory element at said information address representative of an information bit.

References Cited in the file of this patent

UNITED STATES PATENTS

| | | |
|---|---|---|
| 2,920,317 | Mallery | Jan. 5, 1960 |
| 2,988,733 | Mallery | June 13, 1961 |
| 3,000,004 | Weller | Sept. 12, 1961 |

OTHER REFERENCES

Publication I: Bell System Technical Journal, vol. 36, No. 6, November 1957, pp. 1319–1340.